Patented Jan. 1, 1935

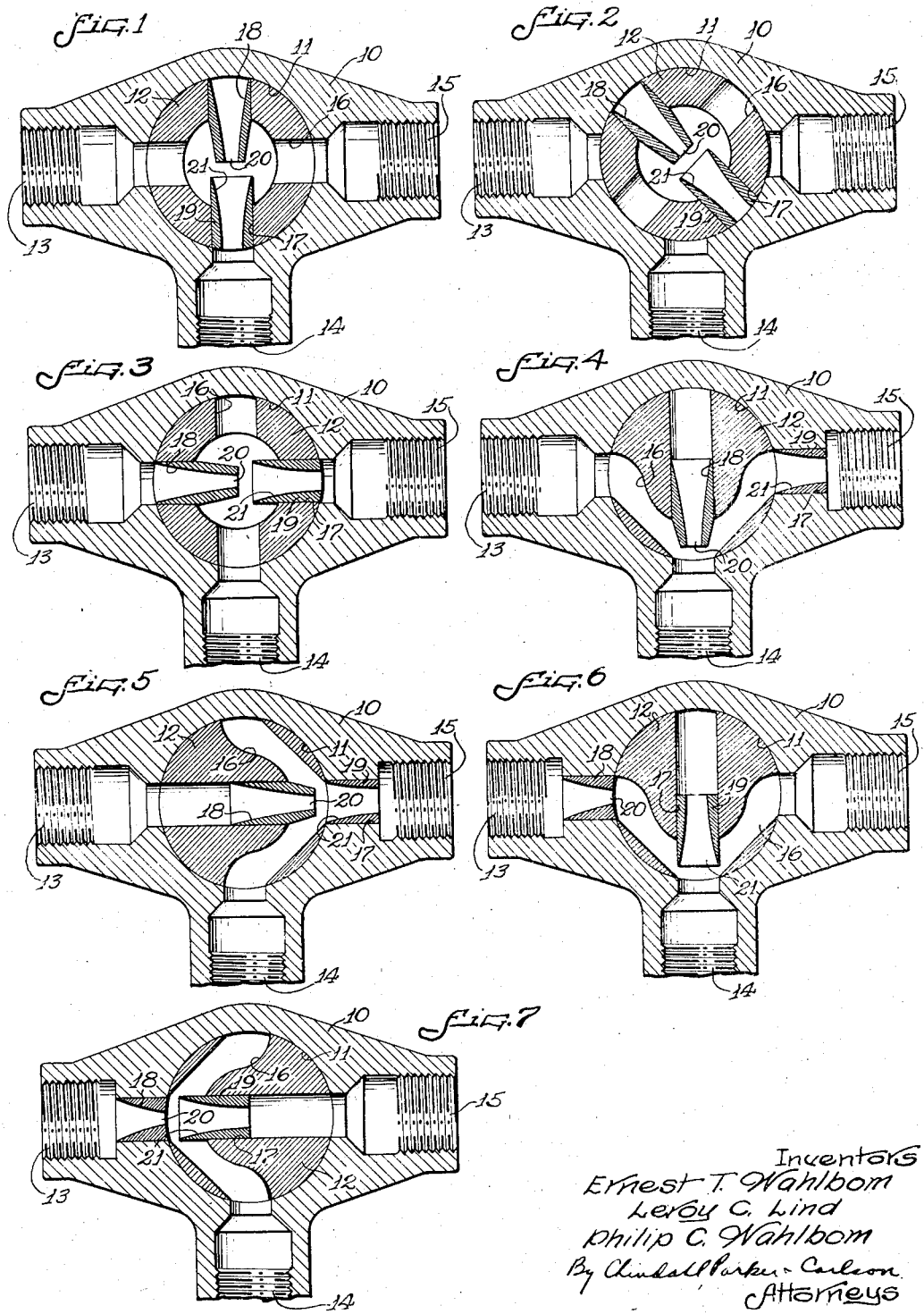

1,986,489

UNITED STATES PATENT OFFICE 1,986,489

VALVE DEVICE

Ernest T. Wahlbom, Leroy C. Lind, and Philip Carl Wahlbom, Rockford, Ill.

Application November 23, 1932, Serial No. 644,028

6 Claims. (Cl. 103—262)

The invention relates generally to a valve device and more particularly to valve devices of the type shown in our Patent No. 1,889,231 issued November 29, 1932.

An object of the invention is to provide an improved device of this character embodying improved means for inducing a flow of fluid through the device.

More specifically stated, an object resides in the provision, in a valve member, of an injector which is disposed in a fluid passageway of the valve member, or which, if the injector is sectional, has at least one section disposed in said passageway for creating a force effective to produce an inflow of fluid through another passageway.

Other objects and advantages will become apparent in the following description and from the accompanying drawing, in which:

Figures 1, 2 and 3 are transverse sectional views taken through a valve device embodying the features of the invention and illustrating three different operative positions.

Figs. 4 and 5 are transverse sectional views through a modified form of structure and showing two positions of operation.

Figs. 6 and 7 are views similar to the foregoing figures and illustrate another structural modification.

While the invention is susceptible of various modifications and alternative constructions, we have shown in the drawing and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

This application is a division of our aforesaid patent with respect to the structure shown in Figs. 1, 2 and 3, and is a continuation in part as regards the structures shown in Figs. 4 to 7 inclusive.

Referring first to the form of valve device shown in Figs. 1, 2 and 3, 10 designates a valve casing having an internal bore or chamber 11 in which a valve member 12 is disposed for relative movement. The particular structure and form of these parts is not material. The casing has a plurality of ports therein, three such ports, indicated at 13, 14 and 15, being shown in this embodiment. These ports, of course, communicate with the chamber 11. The valve member 12 has a transverse bore 16 by which connection between two ports, for example those indicated 13 and 15, may be established as shown in Fig. 1. Extending angularly to the bore 16 is a second bore 17 by which the same fluid flow may be had in a second position of the valve member. The port 14 is arranged to be placed in communication with the fluid stream passing between the ports 13 and 15 by a portion of either bore 16 or 17 depending on whether the ports 13 and 15 are connected by bore 17 or 16.

In our aforesaid patent the valve is employed in connection with a water-softening apparatus and is operable to control the circulatory flow through a softening cycle, or through a regenerating cycle as well as to prevent fluid flow. In said apparatus, the several ports are so connected that in the regenerative cycle the port 13 is an inlet port for hard water, the port 14 is an inlet port for concentrated brine solution, and the port 15 is an outlet port for diluted brine solution. An inflow of concentrated brine solution through port 14 is effected by what is termed injector means which is carried by the valve member 12 and is operable when said valve member occupies a proper position relative to the flow of the main stream.

A preferred form of injector means comprises two sections, one being a jet orifice section 18 and the other an induction tube section 19, either of which, or both, may be mounted on the valve member 12. The jet orifice section in this instance is a tubular member having a tapering bore terminating in a restricted discharge orifice 20. The induction tube section is likewise a tubular member having an internal bore 21 flaring toward the discharge orifice 20 when the parts are operatively associated.

As shown in Figs. 1, 2 and 3, the sections 18, 19 are both mounted on the valve member in the passageway 17, the jet orifice section being arranged at one end of the passageway to discharge inwardly of the valve member and the induction tube section 19 being located at the opposite end of the passageway to receive the jet of fluid from the orifice 20 and direct the flow into port 15. The passageway 16 opens into the space between the two injector sections.

When the parts of the valve device are disposed as shown in Fig. 1, the fluid stream passes directly through the valve member since the injector means is inactively positioned with respect to said stream. In this position, if desired, the sections, or one section, may be arranged to by-pass fluid from the passageway 16 outwardly through the port 14.

When the valve member 12 is shifted into the position shown in Fig. 2, circulation through the device is prevented. Further shifting movement carries the parts into the relation shown in Fig. 3 wherein the jet orifice section 18 is adjacent the inlet port 13, one part of passageway 16 forms a duct communicating with port 14, and the induction tube section 19 is opposite port 15. The flow of the main fluid stream into port 13, through passageway 17 to port 15 produces a force, by the injector action of cooperating sections 18 and 19, which is exerted to cause an inflow of fluid through the duct communicating with port 14. Obviously, a proper correlation of the sections of the injector means will determine the volumetric proportion of indrawn fluid to the main fluid stream.

Figs. 4, 5 and Figs. 6, 7 show modified forms of structure in which only one injector means section is mounted on the valve member 12. Referring to Figs. 4 and 5, and with the reference numerals remaining unchanged, the jet orifice section 18 is mounted in the valve member 12 to discharge into the induction tube section 19 which is fixed in the casing 10 adjacent to the port 15. The passageway 16 preferably follows a somewhat arcuate path through the valve member to allow the jet orifice section to be located relatively close to the cooperating induction tube section while still providing communication between port 14 and the space between the injector sections.

In the structure illustrated in Figs. 6 and 7 the jet orifice section is mounted on the valve casing adjacent to port 13 for discharging a jet of fluid into the induction tube section which is carried by the valve member 12. Otherwise, the structure is substantially the same as that shown in Figs. 4 and 5.

In the two last mentioned forms, the structural arrangement is such that the injector means is operative only when the main fluid stream moves in one direction through the device. But in the form shown in Figs. 1, 2 and 3, the main flow may be reversed and the valve member 12 so disposed that the induced flow is still obtained. Such a relationship would be present, for example, if the valve member 12 were moved 180° from its position as shown in Fig. 3.

It will be evident from the foregoing that a novel valve device has been produced which is simple in construction, efficient in operation and which may be used, not only in water softening apparatus, but in many other fields wherever it is desirable to introduce a fluid flow by the action of a force created by the flow of a main fluid stream.

We claim as our invention:

1. In a valve device, the combination of a valve casing and a valve member mounted therein for relative movement, said casing having ports therein, said valve member having a passageway arranged to be positioned to conduct fluid from one port to another, and an injector device composed of separable sections positioned in said passageway for actuation by such flow of fluid, both sections of said device being carried by said valve member, said member having a passageway opening between the injector sections and connected with a third port.

2. A valve device comprising, in combination, a casing having three ports, a valve member rotatably mounted in said casing and having connected passageways therein adapted in one position of said member to establish communication between the ports, and a pair of separable tubular members having a tapering and a flaring bore to form respectively a jet orifice section and an induction section and adapted to form an injector when positioned so that the flow through the valve is from the jet to the induction section, at least one of said tubular members being inserted in a passageway of and carried by said valve member.

3. A valve device comprising, in combination, a casing having three ports, a valve member rotatably mounted in said casing and having two intersecting passageways adapted in one position of the member relative to said casing to establish communication between said ports, and a pair of tubular members positioned in one of said passageways and shaped to create injector action on the fluid in the other passageway when fluid is flowing through the first mentioned passageway, said tubular members being adjustable longitudinally in said valve member to vary the injector action.

4. A valve device comprising, in combination, a casing having an inlet and an outlet port oppositely disposed, a valve member rotatably mounted in said casing and having a passageway adapted in one position of said member to establish communication between said ports, spaced members positioned in the passageway and adjustable in the direction of flow relative to each other, each member having a bore tapering in the direction of flow when the flow is through said passageway from the inlet to the outlet port, said casing having a third port, and said valve member a second passageway intersecting the first mentioned passageway at the inner ends of the members and communicating with the third port when the first passageway interconnects the inlet and the outlet port.

5. A valve device comprising, in combination, a casing having a pair of ports oppositely disposed, a valve member rotatably mounted in said casing and having a passageway therein adapted in one position of the said member to establish communication between said ports, said casing having a third port, and a pair of tubular members one having a tapering bore to form a jet orifice section and the other having a flaring bore to form an induction section, one of said members being adapted to be inserted in one of said first mentioned ports, and the other member being adapted to be inserted in the passageway of said valve member at the end adjacent the first mentioned member when said valve member is positioned to connect the oppositely disposed ports, said valve member having a second passageway intersecting the first mentioned passageway at the end carrying a tubular member and communicating with the third port when the oppositely disposed ports are connected.

6. In a valve device, the combination of a casing member and a valve member mounted in said casing member for movement relative thereto, said casing member having three ports therein, said valve member having a bore arranged to be positioned to conduct fluid from one port to another and forming with said ports a passageway through the device, and an injector device for actuation by such flow of fluid and composed of separable sections each inserted in one of said members and positioned in said passageway, said valve member having a second bore connected with the third port to provide a passageway opening between the injector sections.

ERNEST T. WAHLBOM.
LEROY C. LIND.
PHILIP CARL WAHLBOM.